Patented Jan. 26, 1943

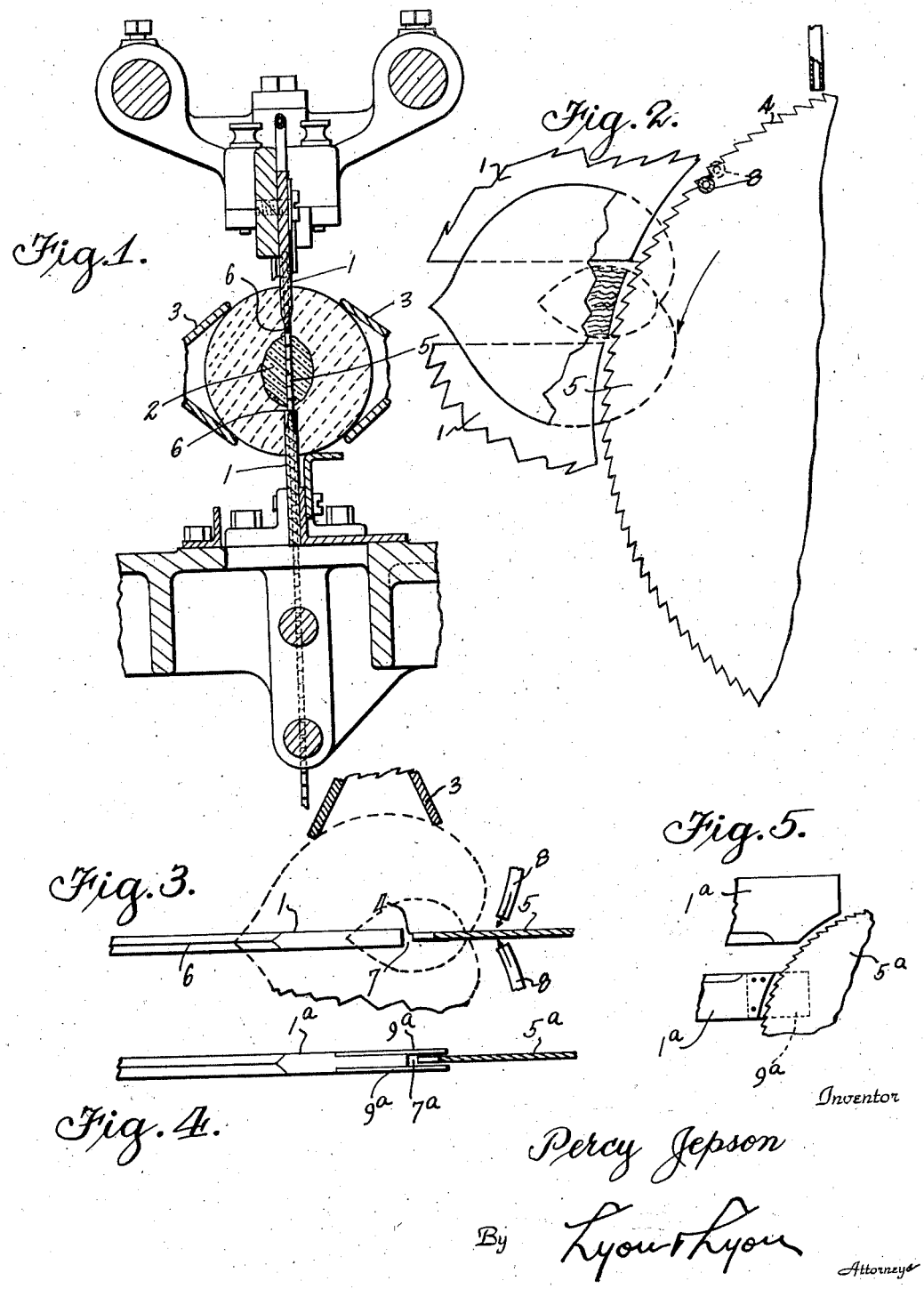

2,309,321

UNITED STATES PATENT OFFICE 2,309,321

FRUIT TREATING MACHINE

Percy Jepson, San Francisco, Calif., assignor to Pacific Machinery Company, San Francisco, Calif., a corporation of California Original application June 14, 1938, Serial No. 213,604. Divided and this application January 27, 1941, Serial No. 376,093

2 Claims. (Cl. 146—73)

This invention relates to fruit treating machines, and more particularly to a machine adapted for bisecting peaches and particularly clingstone peaches preparatory to removal of the pits.

While the machine of this invention is particularly directed to a machine for bisecting peaches, including the pits thereof, it will be appreciated that the machine of my invention is adapted for bisecting other fruits and their pits or stones as will be readily appreciated by those skilled in the art.

In the preparation of fruit for canning, drying, or other subsequent processing, it has for a long time been suggested, and many patents have been issued illustrating the bisecting of the fruit, particularly clingstone peaches, by sawing the fruit, including the pit or stone thereof, in half. It has been found that in many instances this is the most efficient manner of handling fruit in order to permit the removal of the pits or stones, but heretofore this effort has not been practiced, particularly upon high-grade packs, because of the production of sawdust or pit chips which embed themselves into the halves of the fruit.

I have discovered that this problem is overcome by forming a cleft in the flesh of the fruit in advance of the operation of the saw which is sufficiently wider than the thickness of the saw, and which is maintained at the time of operation of the saw so that the sawdust or chips as they are cut or broken from the pits or stones are thrown by the saw through the path formed by the cleft away from the fruit halves.

This application is a division of my copending application filed June 14, 1938, Serial No. 213,604, for Fruit treating machine, which became Patent No. 2,257,341 on September 30, 1941.

It is therefore an object of this invention to provide a means of bisecting fruit, including the pits or stones thereof, which means includes a cutting saw, and means for so positioning and holding the fruit with reference to the saw as to form in the flesh of the fruit at the point of saw engagement a cleft which is wider than the thickness of the saw to provide a path through which the pit fragments or sawdust may be passed, and thereby to avoid the embedding of the sawdust or pit fragments in the fruit flesh.

Other objects and advantages of this invention it is believed will be apparent from the hereinafter contained description of a preferred embodiment thereof as illustrated in the accompanying drawing.

In the drawing:

Figure 1 is a horizontal fragmental sectional view of a fruit bisecting machine illustrating a fruit and pit bisecting means embodying my invention.

Figure 2 is a fragmental view of a bisecting saw illustrating the means which may be used in connection with bisecting of the pit for freeing the bisecting saw from sawdust and other foreign matter.

Figure 3 is a fragmental view illustrating the relation of the fruit impaling member and the bisecting saw and a means provided for freeing the saw from sawdust and other foreign matter.

Figure 4 is a view similar to Figure 3 illustrating a modified form of structure embodying my invention and the relation of the fruit impaling member and the bisecting saw in such modified structure.

Figure 5 is a fragmental elevation of the modified structure as illustrated in Figure 4.

In the preferred embodiment of my invention as illustrated in the accompanying drawing, 1 indicates a pair of impaling blades upon which a fruit such as a clingstone peach is adapted to be impaled with its pit 2 positioned between the blades 1. The blades 1 may be supported in any suitable or desirable manner as generally indicated and as will be more fully apparent from my application, Serial No. 213,604. The fruit as impaled may be either manually or machine fed along the impaling blades 1 and may be held in position thereon by means of holding cups 3 which move the fruit along the impaling blades 1 and hold the same in position upon the blades 1 and for transfer across the cutting edge 4 of the bisecting saw 5. The saw 5 is supported in any suitable or desirable manner and is rotated by any suitable source of power. The impaling blades 1 are preferably provided with cutting edges 6 tapered down from the blades in order to form a clean cut through the flesh of the fruit as the same is impaled in position upon the blades.

The impaling blades 1 are of a width sufficient to form in the flesh of the fruit a cleft or path of material width and may be formed adjacent the point of engagement of the cutting edge 4 of the saw 5 of uniform thickness omitting the tapered cutting edge 6 so that the cleft formed in the fruit is expanded more nearly to a uniform width at the point of engagement as generally indicated at 7 of the pit 2 with the said cutting edge 4. The saw 5 is a disc saw having the cutting edge 4 and is of a thickness which is materially less than the width of the impaling blades 1 at the point of engagement 7. In actual practice it has been found that a saw blade of 1/32 of an inch thickness operates very effectively when used in connection with impaling blades the width of which is in the neighborhood of 1/8 of an inch at the end adjacent to the said point of engagement 7. These dimensions are given merely for purposes of illustration as obviously other dimensions may be utilized advantageously where the width of the impaling blades is maintained materially greater than the width of the saw 5 so that the cleft formed in the flesh of the fruit is maintained greater than the saw width at the point 7.

In order to maintain this relationship, as will be apparent from Figure 3, the impaling blades project up quite close to the edge 4 of the saw 5 so that substantially no opportunity is left for the fruit flesh to contract together at the point of engagement 7.

As will be apparent from the parent application, Serial No. 213,604, the fruit as impaled upon the impaling blades 1 is formed with a complete annular cleft which may be accomplished in any suitable manner as, for example, by rotating the fruit after it is initially impaled upon the blades 1, or by providing additional fruit flesh-severing means in the path of the fruit along the impaling blades 1. Thus a complete annular cleft is formed. A most important feature, however, of my invention with respect to the relationship is, as described, that the flesh of the fruit is held sufficiently spread at the point of engagement 7 of the cutting edge 4 of the saw 5 with the pit 2 as it is at this interval that the sawdust is formed and pit fragments are often separated from the pits which otherwise become embedded in the fruit flesh.

To further assist in maintaining the meat of the fruit free of sawdust or pit chips, a stream of water may be directed from nozzles 8 against each side of the saw just above the portion of the saw blade which enters the fruit, this relation of the water jets being shown in Figures 2 and 3. The water or other fluid provided by these jets will be carried by the saw through the fruit and will act as a cushion in preventing sawdust and pit fragments from becoming embedded in the meat portion. Attention is directed to the positioning of these jets in that they are spaced one tooth apart in order to more effectively perform their cleaning operation. If preferred, the jets may be spaced a greater number of teeth apart and more jets may be provided. Also it is preferred to jet the cleaning fluid against the saw in angle relation thereto as shown in Figure 3.

In the modified form of my invention as illustrated in Figures 4 and 5, similar parts have been indicated with the same numerals with the addition of an exponent "a" thereto.

In this modification of my invention, in order to maintain the channel through the expanded cleft formed in the flesh of the fruit in which the saw blade $5^a$ operates, there is mounted upon impaling blades $1^a$ at the point of engagement $7^a$ a pair of thin plates $9^a$ between which the saw $5^a$ projects in reaching the point of engagement $7^a$ with the pit.

Having fully described my invention, it is to be understood that I do not wish to be limited to the details herein set forth, but my invention is of the full scope of the appended claims.

I claim:

1. In a machine for bisecting pit containing fruit, a rotary saw, an impaling blade mounted in co-planar relation to said saw for supporting and guiding fruit into operative relation therewith, said impaling blade terminating forwardly of and in closely clearing relation to the cutting edge of the saw whereby to firmly support the fruit pit during the sawing operation, the thickness of said impaling blade immediately adjacent said saw being greater than that of the saw whereby to form an expanded cleft during the sawing operation in the flesh of the fruit at the point of engagement of the fruit pit and the cutting edge of the saw sufficient to enable the saw to move its cuttings through said cleft without embedding them in the flesh of the fruit, and means for rotating the saw in a direction to move its cuttings through the cleft formed in the fruit by said impaling blade.

2. In a machine for bisecting pit containing fruit, a rotary saw, an impaling blade mounted in co-planar relation to said saw for supporting and guiding fruit into operative relation therewith, said impaling blade terminating forwardly of and in closely clearing relation to the cutting edge of the saw whereby to firmly support the fruit pit during the sawing operation, the thickness of said impaling blade immediately adjacent said saw being greater than that of the saw whereby to form an expanded cleft during the sawing operation in the flesh of the fruit at the point of engagement of the fruit pit and the cutting edge of the saw sufficient to enable the saw to move its cuttings through said cleft without embedding them in the flesh of the fruit, means for rotating the saw in a direction to move its cuttings through the cleft formed in the fruit by said impaling blade, and means for delivering a cleansing liquid into the teeth of said saw at a point immediately in advance of their point of sawing engagement with the fruit pit whereby to enable said teeth to engage and carry a part of said liquid through the cleft of the fruit to flush said cleft with the liquid.

PERCY JEPSON.